United States Patent
Tsai

(10) Patent No.: US 6,708,618 B1
(45) Date of Patent: Mar. 23, 2004

(54) METHOD AND APPARATUS OF USING A SECURITY FEATURE WHICH INCLUDES PLURAL PATTERNED MICROSCOPIC MAKERS FOR AUTHENTICATION AND TO PREVENT COUNTERFEITING OF OBJECTS

(76) Inventor: Chialun Tsai, 1639 Calle de Oro, Thousand Oaks, CA (US) 91360

( * ) Notice: Subject to any disclaimer, the term of this patent is extended or adjusted under 35 U.S.C. 154(b) by 0 days.

(21) Appl. No.: 10/358,482

(22) Filed: Feb. 4, 2003

Related U.S. Application Data

(63) Continuation-in-part of application No. 09/693,160, filed on Oct. 23, 2000, now abandoned.

(51) Int. Cl.⁷ ................................................. B41F 31/00
(52) U.S. Cl. ................. 101/491; 101/31.23; 101/31.13; 427/7; 283/70; 283/72; 283/76; 283/93
(58) Field of Search ........................... 101/31.13, 31.23, 101/491; 427/7; 283/70, 72, 76, 93

(56) References Cited

U.S. PATENT DOCUMENTS

| | | | |
|---|---|---|---|
| 4,806,740 A | * 2/1989 | Gold et al. ................. 235/449 |
| 5,197,765 A | * 3/1993 | Mowry et al. ................. 283/93 |
| 5,411,799 A | * 5/1995 | Loving ........................ 428/343 |
| 5,434,917 A | * 7/1995 | Naccache et al. ........... 713/176 |
| 5,516,362 A | * 5/1996 | Gundjian et al. ........ 106/31.32 |
| 5,704,651 A | * 1/1998 | Phillips ........................ 283/93 |
| 5,762,378 A | * 6/1998 | Phillips ........................ 283/72 |
| 5,772,248 A | * 6/1998 | Phillips ........................ 283/91 |
| 5,826,916 A | * 10/1998 | Phillips ........................ 283/91 |
| 5,873,604 A | * 2/1999 | Phillips ........................ 283/70 |
| 5,904,375 A | * 5/1999 | Brugada ....................... 283/85 |
| 6,309,690 B1 | * 10/2001 | Brogger et al. ................. 427/7 |

* cited by examiner

Primary Examiner—Andrew H. Hirshfeld
Assistant Examiner—Andrea H. Evans
(74) Attorney, Agent, or Firm—Jack C. Munro

(57) ABSTRACT

An apparatus for authenticating an object on the basis of incorporating onto the object at least one security feature known as a microdot which includes plural unique microscopic patterned markers each of which include indicia and the method of making such microdots.

7 Claims, 4 Drawing Sheets

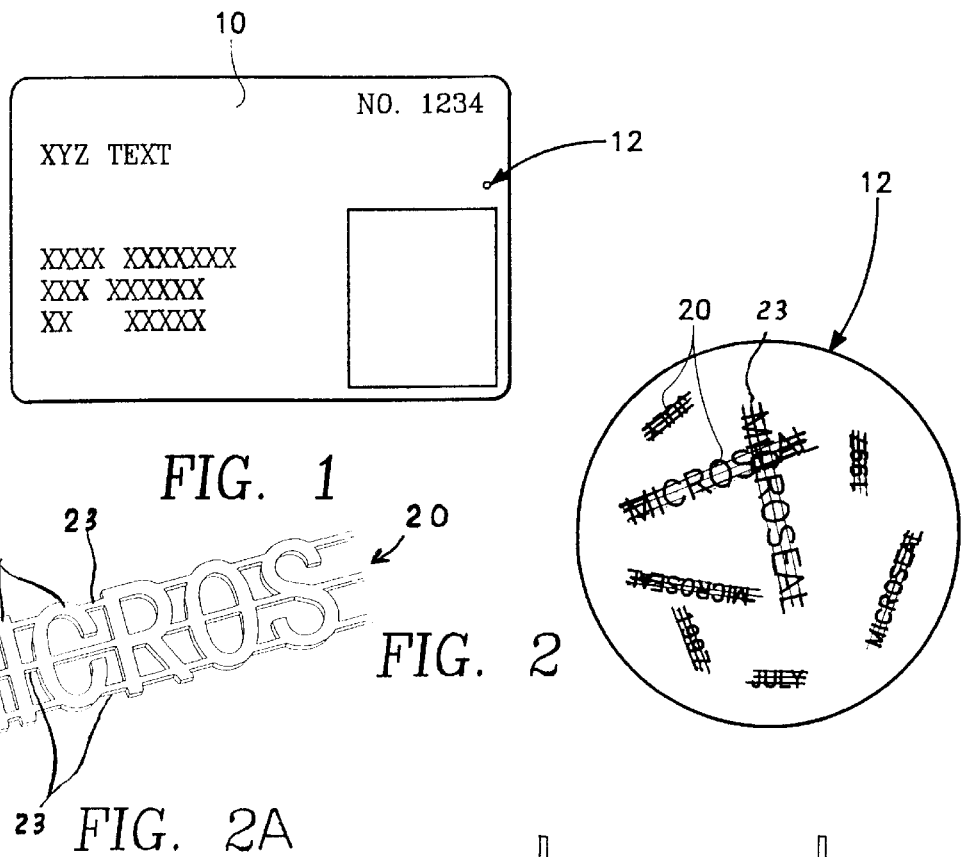
FIG. 1
FIG. 2
FIG. 2A
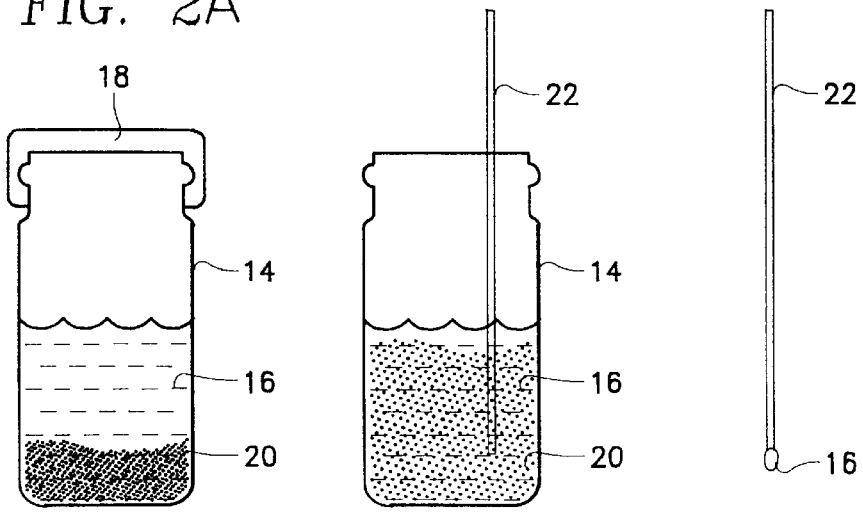
FIG. 3   FIG. 4   FIG. 5

METHOD AND APPARATUS OF USING A SECURITY FEATURE WHICH INCLUDES PLURAL PATTERNED MICROSCOPIC MAKERS FOR AUTHENTICATION AND TO PREVENT COUNTERFEITING OF OBJECTS

REFERENCE TO PRIOR APPLICATION

This application is a continuation-in-part of U.S. patent application Ser. No. 09/693,160, filed Oct. 23, 2000 now abandoned by the present inventor and by the same title.

BACKGROUND OF THE INVENTION

1). Field of the Invention

This invention relates to the authentication of objects, and more particularly to authentication based on applying a security feature in the form of plural microscopic markers each of which includes indicia as an unique identifier for the object.

2) Description of the Prior Art

There are wide ranges of security features in the prior art that are supposed to be counterfeit proof or designed to deter counterfeiting to ensure authenticity of an object. For example, security features such as a hologram, water marking, special inking, color security fibers, etc. There are several important criteria to deter counterfeiting. First is to control the resources such as the accessibility of the raw materials and the fabrication facilities. This provides the first level of security by making it difficult for counterfeiters to acquire the materials and facilities that are needed to counterfeit products. Second is to form a counterfeit proof design of the security feature applied to the object. A good counterfeit proof feature makes it extremely difficult to reproduce the feature, therefore insuring the uniqueness of the feature, thereby deterring counterfeiting. The third important criteria is the authenticating process which relates to the accessibility of the examining equipment to identify or authenticate the security feature.

Few applications fulfill all requirements to provide absolutely counterfeit proof security thus leaving room for fraud. For example, holographic security features that are common in credit card applications need hi-tech comprehensive laboratory facilities to produce. It provides a level of security via restricted access to lab facilities. However, all replicas of a holographic security feature are identical and it is difficult for user to distinguish between a valid one or a counterfeit one. The authentication equipment needed is expensive and not accessible to places where the transactions take place. Thus, the holographic security feature suffers the risk of the probable theft of the original replica as well as the difficulty for a user to properly identify a genuine security feature.

Other examples are shown in U.S. Pat. Nos. 4,806,740 and 5,434,917 which use random magnetic medium scattered on a flat card like object used as a money card or credit card. The unique random characteristic of scattered magnetic medium is essentially counterfeit proof once the characteristic of its pattern is scanned and registered to a secured central database. No two cards are alike. It suffers from a relatively easy fabrication process and the randomly scattered medium provides no further information except its guaranteed uniqueness when produced. A secure control of the central data base and registration process provides a high degree of security. Process of reading the unique random characteristic signal and compare such to its stored data is relatively easy and equipment can be easily supplied in relation to a credit card or money card where the transaction takes place.

SUMMARY OF THE INVENTION

The present invention fulfills all criteria above in certain application requirements. Firstly, product can be mass produced to provide low cost but the fabrication process requires hi-tech, comprehensive, integrated circuit or micromachining facilities; such facilities are limited and enormous investments for counterfeiters. Secondly, despite the mass-production process, each fingerprint like marker containing indicia is unique and counterfeit proof. Thirdly, this invention can be designed so that a layman can perform an authentication process with inexpensive devices such as a low cost, low magnitude loupe or microscope.

To provide an unique and counterfeit proof security feature known as a microdot for an object, utilizing the random nature of application of a plurality of microscopic markers which, when fastened to a valuable object, creates a one-of-a-kind security marker, is an excellent way to provide a counterfeit proof pattern. The random scattered pattern of the markers and its microscopic size not only guarantee its uniqueness but also it is essentially impossible and impractical to produce an exact copy on a microscopic level. The indicia of the marker or markers is selected by the user which provides an element of uniqueness in that all markers will carry different indicia. This invention concept has the great advantage of producing counterfeit proof patterns that are easy to produce but exceedingly difficult to reproduce an exact copy. By installing of such a microdot in conjunction with a valuable object makes it literally impossible to reproduce an unauthorized copy of the valuable object and tout such as the original; thus, it is counterfeit proof and the microdot can be used as a unique record of an object for authentication purposes.

This invention uses new micromachining technology to custom make microscopic markers in mass. Such microscopic markers can be patterned to become all kinds of shapes. The markers can be formed as graphics, logo, personal signatures, dates, words, etc. The range of the microscopic sizes is only limited by the lithographic process common in integrated circuit industry. With the current technology, the resolution can reach to a small fraction of a micron and need a scanning electron microscope (SEM) to observe when applied to an object. Normally, this exceedingly small size is not required for most applications. Despite the present technology that can produce such a minute size, the criteria to determine the usable microscopic size is limited by the cost of the examining equipment. Different sizes and patterns of markers can also be combined to make counterfeiting more difficult. This invention also has the advantage of scaling the microdot size to a certain microscopic size so that a layman could use cheap loupes to perform an authentication process.

There are many ways to produce the indicia containing microdots of this invention. Each microdot includes a plurality of markers mixed with a carrier liquid such as a volatile liquid or an adhesive and then be applied to objects via of several kinds of printing methods such as doting, painting, spraying and the like onto an object. If a volatile liquid is used and after it is vaporized, the security feature can then be fastened to the object as by a coating such with a sealer. The indicia of the security feature can also be preinstalled on labels or mini-taggants which contain randomly scattered, plural microscopic patterned markers. Such labels or taggants can then be applied and fixed to an object forming the object's security or ID feature. In another embodiment, the microscopic markers can be mixed within an object during the fabrication process of the object and become a part of the object.

To authenticate an object, the random pattern of the indicia must be recorded and stored. The authentication process can be as simple as using a simple magnification lens such as a loupe or microscope to observe the indicia and prepare an enlarged picture of the indicia. The picture can be accessed via a central database through network or internet, or via of a printed form. Any copied version without the original indicia can be easily identified. The application can easily apply to all flat objects such as ID cards, passports, valuable currency, stocks, bonds, security checks, tax stamps, collectible cards, certificates, titles, vital records, visas etc., as well as 3D objects such as antiques, paintings, art works, products, etc.

Reproduction equipment, such as copy machines and cameras, are not able to copy the microdot of this invention in conjunction with the reproduction of the valuable object. Thus, reproductions of an object can easily be distinguished from the original object.

Furthermore, unlike some current applications using indicia with grind particles, color coded microtaggants, fibers or selecting random microscopic patterns from an object, an indicia in the form of a custom designed marker could reveal information through the design of content of the marker, such as a particular word phrase.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is a plan view of a card-like object that has a security feature in the form of a microdot of this invention applied thereon;

FIG. 2 is an enlargement of the microdot of FIG. 1 showing the indicia of a random arrangement of microscopic markers contained in the microdot;

FIG. 2A is an enlarged view of a marker showing how the marker is constructed;

FIG. 3 is a cross-sectional view through a closed vial that contains a liquid medium within which is suspended a mass of the markers to be used in the microdot of this invention;

FIG. 4 is a view similar to FIG. 2 but with the vial open and an elongated, thin implement being inserted into the liquid;

FIG. 5 is a longitudinal exterior view of the elongated, thin implement which has been extracted from the vial with an aliquot of the liquid, which contains a plurality of the markers adhered located at the tip of the implement by surface tension;

DETAILED DESCRIPTION OF THE PREFERRED EMBODIMENT

Figure 6:
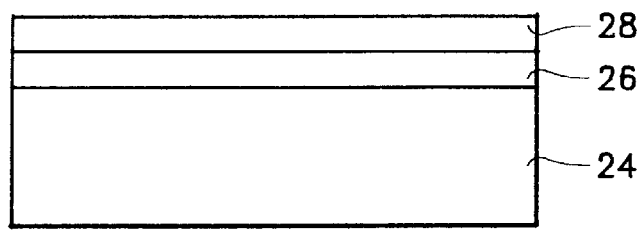
FIG. 6 is a side edge view of a substrate which is used to begin production by a first manufacturing method of the microscopic markers used in this invention.

Referring particularly to FIG. 1, there is shown a document 10. This document 10 could comprise a credit card, visa, or any type of important document where it is important that this document is not to be duplicated in an unauthorized manner. Somewhere on the face of this document, there is located a security feature in the form of microdot 12. The microdot 12 can actually be applied by a small, thin tube-like implement 22 being placed within the vial 14 of FIG. 2 and submerged within the liquid 16 after removal of the cap 18 from the vial 14. Within the liquid 16, there is contained a quantity of markers 20. Typically, the vial 14 is to be shaken with the cap 18 still installed so that the markers 20, which resemble tiny grains of sand, become somewhat evenly distributed throughout the liquid 16. The liquid 16 could comprise alcohol or possibly some type of a liquid adhesive. With the markers 20 somewhat evenly distributed throughout the liquid 16, the cap 18 is removed and the thin tube-like implement 22 is partially submerged within the liquid 16. This insertion of the implement 22 within the liquid 16 is shown within FIG. 4. The tube-like implement 22 is then removed from the vial 14, as shown in FIG. 5 with the result that some of the liquid 16 remains on the tip of the tube implement 22. Contained within that liquid 16 are a plurality of the markers 20 interspersed in a random arrangement. The normal range of sizes for the markers 20 will be between a few millimeters and one micron. The user then takes and places the quantity of liquid 16 at the tip of the implement 22 at a desirable location in contact with the upper surface of the document 10. Sufficient time is then given for the liquid 16 to evaporate or dry, and if alcohol is the liquid 16, then a sealing layer, which is not shown, is applied over the surface of the microdot 12 which will cause the markers 20 to be then fixed in position. Each time the implement 22 is placed within the liquid 16 and removed with the aliquot of the liquid 16 then being deposited at the desirable location, there is a different random arrangement of the markers 20. Thereby each microdot 12 is unique with duplication being virtually impossible.

Each marker 20 can comprise a pattern of some sort. The pattern could comprise a word or a series of words. The pattern could comprise a logo of some type. It could comprise a graphic representation. The markers 20 are to be so small that they are of microscopic size and observable only by the use of a magnifying device, which is not shown. In reference to the present invention, the markers 20 are shown as a single word "microseal". Also, there could be included other words in addition to the word "microseal" such as a month and a year. It is to be understood that the content of the microdot 12 is to be selected by the user.

Each marker 20 is constructed of a series of single layer segments, which is shown in FIG. 2A to comprise alphabetical letters 21. These letters 21 are connected together by connecting strips 23 which function to hold together the different letters 21 that make up the selected word. There is shown three in number of spaced apart strips 23 located parallel to each other. However, the number these strips 23 could be increased or decreased and need not be parallel. These strips 23 are located principally interiorly of the periphery of the marker 20 so there is only a minimal amount of structure attached to the marker 20 located exteriorly of the marker. The minimal amount of structure will comprise projection 25. This minimizes the size of the marker 20 which means a greater number of the markers 20 are located within each microdot 12. Each marker 20 is quite thin (0.1 micron to 10 microns). The reason for this is so each marker 20 will not come to rest on edge in the microdot. The fact that each marker 20 is a single layer makes it easier to manufacture.

Within the liquid 16 of the vial 14, there will normally be thousands of the markers 20. The markers 20 could be applied in other ways other than using of an implement 22. Also, the markers 20 could be fabricated in conjunction with an object when it is fabricated as is when a sheet of paper is manufactured or a credit card is manufactured. However, one particular use for the markers 20 would be to locate such on a gemstone so that an individual's gemstone is uniquely marked so a particular person could determine that if the gemstone has been given to a jeweler for maintenance, that that gemstone is returned and not a substitute.

Figure 7:
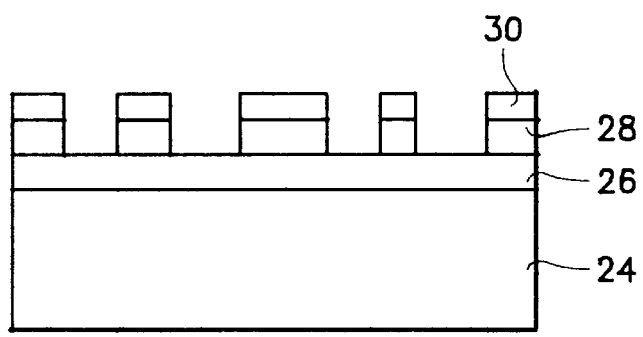
FIG. 7 is a side edge view of the substrate of FIG. 6 to which has been applied a photosensitive layer with this photosensitive layer being lithographically patterned and structure layer being etched.
Figure 8:
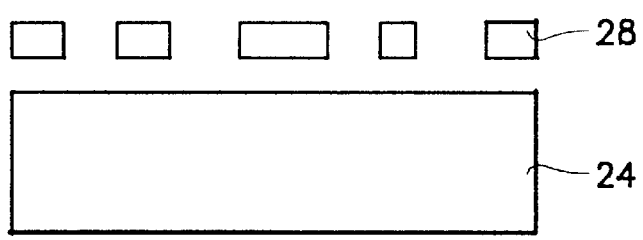
FIG. 8 depicts dissolving of the patterned photoresist layer and a sacrificial layer which leaves only the patterned microscopic markers.

FIGS. 6–16 of the drawings are directed to different embodiments of manufacturing of markers. Referring particularly to FIGS. 6–8, there is shown the first embodiment of manufacturing which utilizes a supporting substrate 24 on which has been applied a sacrificial layer 26. A common material for the substrate 24 would be silicon with the sacrificial layer 26 comprising silicon oxide. Applied to the sacrificial layer 26 is a structural layer 28. The structural layer 28 is what will provide the material for the microscopic markers 20.

A photosensitive mask material 30 is added onto the structural layer 28. The photosensitive layer 30 is patterned with a mask which contains copies of patterns of the indicia for the markers 20. The etching is then applied which results in removing the exposed structural layer 28. The portions of the structural layer 28 that are covered by the photosensitive layer 30 is protected etching.

The entire structure of FIG. 7 is then submerged sequentially into two different chemical solutions which dissolves completely the sacrificial layer 26 and the photosensitive layer 30 leaving only the structural layer 28. What is produced is a mass quantity of the structural layer 28 which will comprise the markers 20. The different structural layers 28 which comprise the markers 20 are then collected and will normally then be placed within a liquid 16 within a vial 14 and is now ready for usage.

Figure 9:
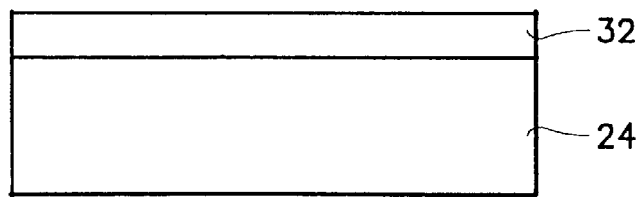
FIG. 9 shows a base substrate of a second manufacturing method with a photosensitive layer applied thereon which is to be used to manufacture microscopic markers used in this invention.
Figure 10:
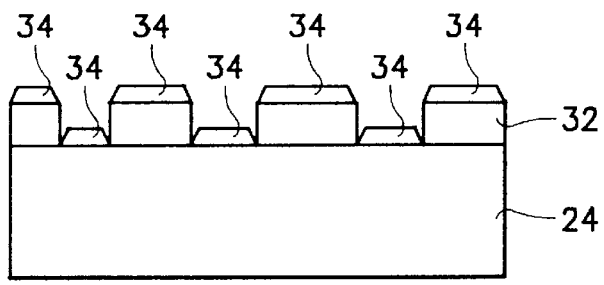
FIG. 10 show the photosensitive layer of FIG. 9 being lithographically patterned and a structural layer deposited thereon and because of the variance in height of the pattern of the photosensitive layer, such is broken forming raised structural blocks.
Figure 11:
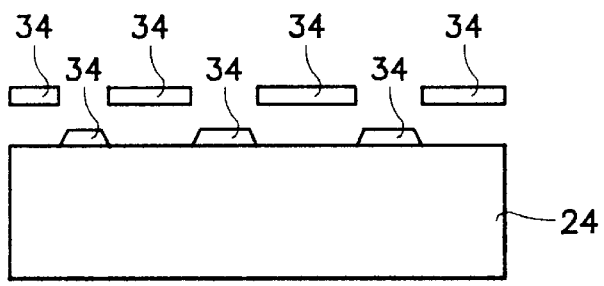
FIG. 11 shows the photosensitive layer being dissolved to leave the microscopic markers which are made from the structural layer.

Referring particularly to FIGS. 9–11 of the drawings, there is shown a second embodiment of manufacturing of this invention where there is used the same substrate 24.

Applied onto the substrate 24 is a photosensitive layer 32. This photosensitive layer 32 is then exposed photographically in order to produce the desired pattern. A structural material, such as a polysilicon, is to then be applied onto the photosensitive material 32. The exposing of the photosensitive layer 30 photographically has produced an uneven surface with the result that the structural layer 34 is deposited onto the substrate layer 20 at different heights. The structural layer 34 will break off at the edges, as shown in FIG. 10. Referring to FIG. 11, the substrate layer 32 is then dissolved leaving only the microscopic markers 20 which are now shown to comprise the different elements of the structural layer 34.

Figure 12:
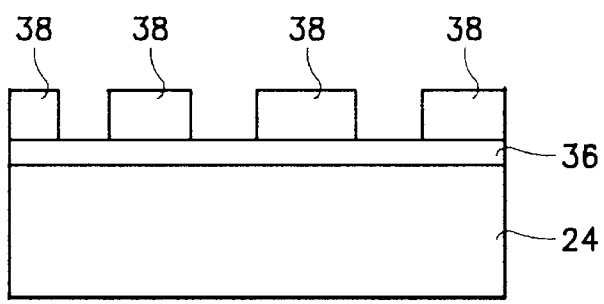
FIG. 12 shows a substrate of a third manufacturing method with a seed layer with a photosensitive layer being deposited on the seed layer with the photosensitive layer being photo-lithographically patterned.
Figure 13:
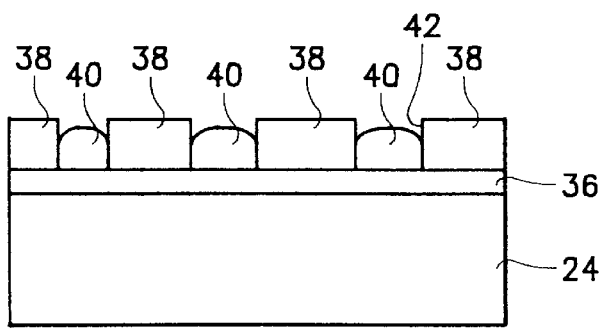
FIG. 13 shows a structural layer that is produced within the trenches of the patterned photosensitive layer of FIG. 12.
Figure 14:
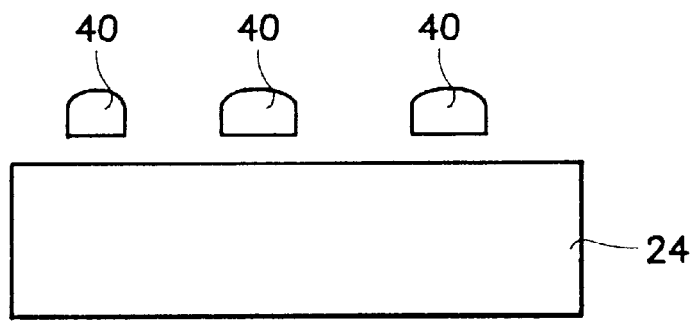
FIG. 14 shows the photosensitive layer and the seed layer being dissolved to leave only the microscopic sized markers made from the structural layer.

Referring particularly to FIGS. 12–14, there is shown a third embodiment of method of manufacturing of the markers 20 of this invention wherein the substrate 24 has applied thereto a seed layer 36. Applied onto the seed layer 36 is a photosensitive layer 38. This photosensitive layer 38 is exposed photographically to form the pattern and then a structural material 40 is grown within the trenches 42 formed within the layer 38. Next, the seed layer 36 and the photosensitive layer 38 are then dissolved leaving only the structural layer 40 which comprises the markers 20. The different markers 20 are then collected and then placed as before within a vial 14.

Figure 15:
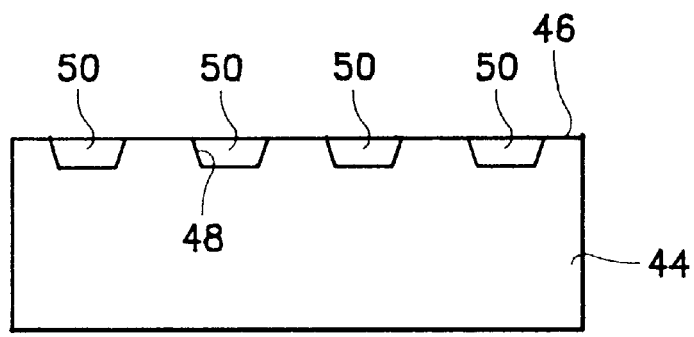
FIG. 15 shows a substrate of a fourth manufacturing method which is patterned and etched to create mold cavities with a structural layer filling the mold cavities to form the microscopic markers.
Figure 16:
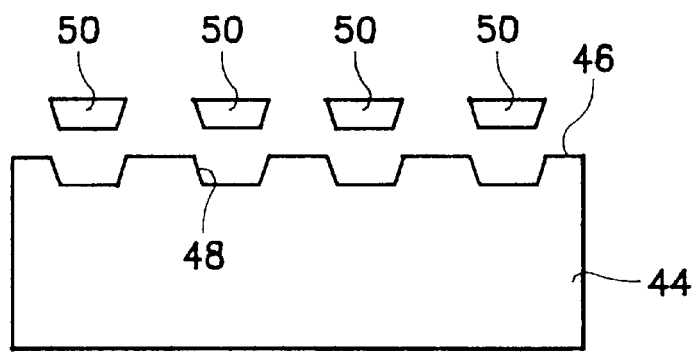
FIG. 16 shows the release of the microscopic markers from the substrate to then be collected.

Referring particularly to FIGS. 15 and 16, there is shown a fourth embodiment of method of manufacturing of this invention wherein the supporting substrate 44 is first patterned on its upper surface 46 and etched to serve as a mold producing a series of mold cavities 48. The structural material 50 is then pressed within the mold cavities 48 which are then released from the cavities 48 which results in the production of the microscopic markers 20, as shown as the different elements 50 in FIGS. 15 and 16.

The present invention may be embodied in other specific forms without departing from the essential attributes thereof. Reference should be made to the appending claims rather than the foregoing specification as indicating the scope of the invention.

What is claimed is:

1. An apparatus to be applied to a valuable object for authenticating and preventing counterfeiting comprising:

an unique security feature known as a microdot which includes a plurality of randomly scattered microscopic markers, each of said markers constructed as a stand alone self supporting design by a manufacturing technique from the group consisting of etching and molding, said design defines a single pattern of indicia, each of said markers being constructed of only a single thin layer of material; and said microdot to be fixedly applied by securing means onto a valuable object, said microdot to be only observable by using a magnifying apparatus in order to authenticate said object by a comparative examination procedure with a known appearance of said microdot, by said plurality of markers being randomly positioned on each valuable object there is produced a totally unique pattern of said markers for each valuable object.

2. The apparatus as defined in claim 1 wherein:

said indicia being identical in conjunction with all said markers.

3. The apparatus as defined in claim 1 wherein:

said indicia being different within at least two of said markers.

4. The apparatus as defined in claim 1 wherein:

the size of a said marker being in the range of a few millimeters to a micron.

5. The apparatus as defined in claim 1 wherein:

each of said markers having a thickness of between 0.1 microns and 10 microns.

6. The apparatus as defined in claim 1 wherein:

said securing means comprising said marker being applied directly onto the valuable object.

7. The apparatus as defined in claim 1 wherein:

said securing means comprising a label which is to be attached to the valuable object.

\* \* \* \* \*